J. L. L. KROOK.
MACHINE FOR CUTTING SHEET METAL.
APPLICATION FILED MAY 31, 1916.
1,226,536.
Patented May 15, 1917.
2 SHEETS—SHEET 1.
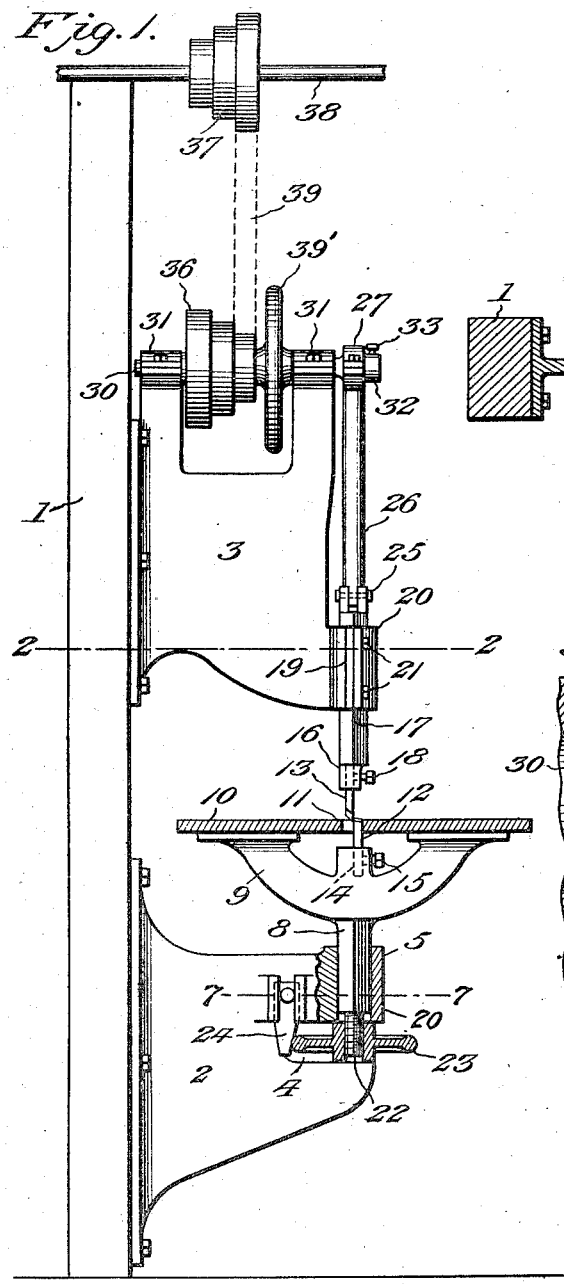
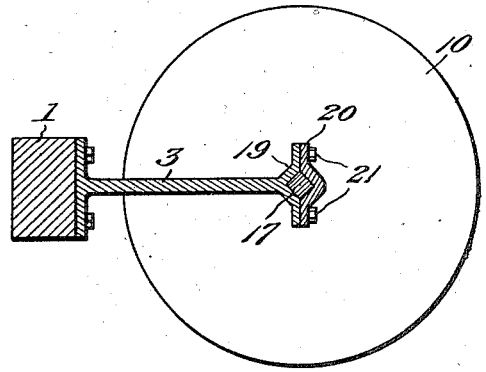
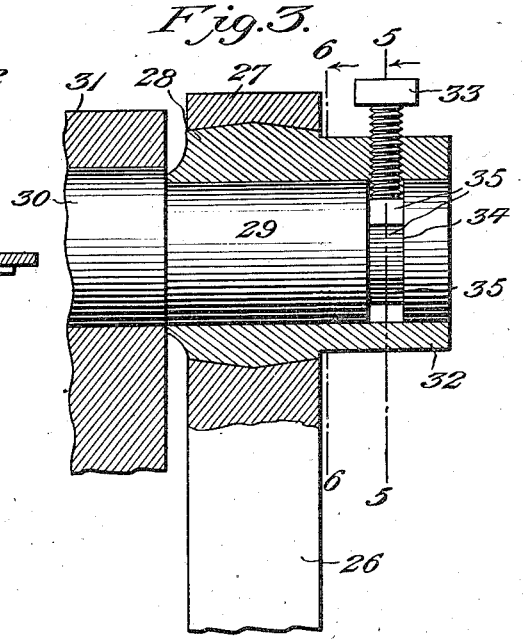
Witnesses
Edwin G. McKee
C. C. Hines
Inventor
J. L. L. Krook
By Victor J. Evans
Attorney

J. L. L. KROOK.
MACHINE FOR CUTTING SHEET METAL.
APPLICATION FILED MAY 31, 1916.

1,226,536.

Patented May 15, 1917.
2 SHEETS—SHEET 2.

Witnesses
Edwin F. McKee
C. A. Hines

Inventor
J. L. L. Krook
By Victor J. Evans
Attorney

UNITED STATES PATENT OFFICE.

JOHN L. L. KROOK, OF PROCTOR, VERMONT.

MACHINE FOR CUTTING SHEET METAL.

1,226,536.     Specification of Letters Patent.     Patented May 15, 1917.

Application filed May 31, 1916. Serial No. 100,833.

*To all whom it may concern:*

Be it known that I, JOHN L. L. KROOK, a citizen of the United States, residing at Proctor, in the county of Rutland and State of Vermont, have invented new and useful Improvements in Machines for Cutting Sheet Metal, of which the following is a specification.

This invention relates to a machine for cutting sheet metal, and particularly to a machine for cutting sheet metal into templets, or performing similar work wherein the material is to be cut along irregular or variously curved lines.

One object of the invention is to provide a metal cutting machine in which the cutting operation is performed by the use of relatively fixed and reciprocating cutting blades, beveled to a prescribed cutting form, and a rapid reciprocating motion is imparted to the movable cutting blade for cutting the material at a desired comparatively rapid speed, whereby through the medium of a small vertical cutting motion in connection with comparatively small shear cutters, small curves may be rapidly and conveniently cut, so that curves of any outline may be produced with facility and convenience.

A further object of the invention is to provide means for relatively adjusting the cutting blades, for varying the throw or cutting motion of the movable cutting blade, and for varying the speed of operation of the movable cutting blade according to its throw or range of cutting motion, whereby advantageous results may be secured.

With these and other objects in view, the invention consists of the features of construction, combination and arrangement of parts hereinafter fully described and claimed, reference being had to the accompanying drawings in which:—

Figure 1 is a side elevation, with the table shown in section, of a sheet metal cutting machine embodying my invention.

Fig. 2 is a sectional plan view on the line 2—2 of Fig. 1.

Fig. 3 is an enlarged vertical longitudinal section through the operating shaft and showing the eccentric collar.

Figure 5:
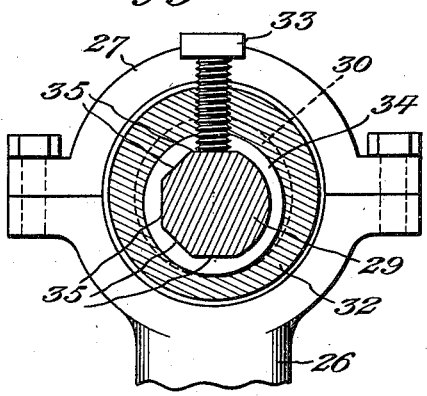
Figure 6:
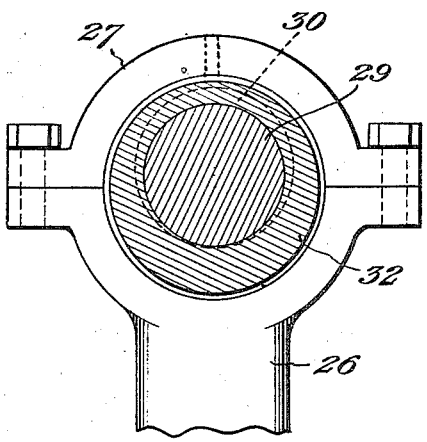

Figs. 5 and 6 are sections on the lines 5—5 and 6—6 of Fig. 3, showing the eccentric collar adjusted for maximum and minimum cutting actions.

Figure 7:
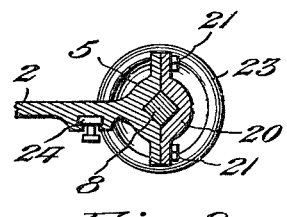

Fig. 7 is a detail section on the line 7—7 of Fig. 1.

Figure 8:
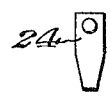

Fig. 8 is a view showing the means for locking the hand wheel employed for adjusting the work table.

Figure 9:
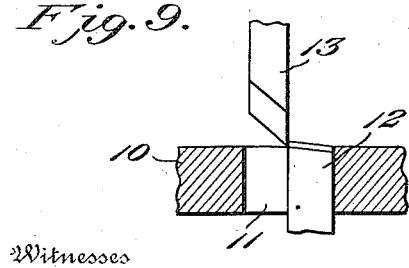
Figure 10:
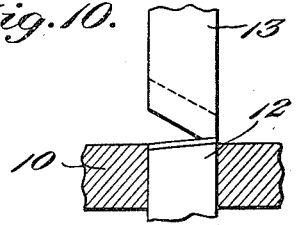

Figs. 9 and 10 are detail views in front and side elevation, respectively, of the cutter blades.

In carrying my invention into practice, I provide a frame structure of a suitable type shown in the present instance as consisting of a post 1 and a pair of superposed brackets 2 and 3 suitably secured thereto. The post 1 is designed in practice to be secured in a vertical position to a wall or other suitable stationary support.

The lower bracket 2 is provided with a transverse slot 4 opening through its forward edge, and above said slot has a sleeve 5 of angular form in cross section to receive a depending post 8 of similar form depending from a yoke 9 supporting the work table 10, which work table is provided with an opening 11 therein in which operate the fixed and movable cutting blades 12 and 13. The yoke is provided with a socket or holder 14 to receive the cutter 12, which is secured therein by a set screw 15, while the cutter blade 13 fits within a socketed holder 16 at the lower end of a reciprocating carrier 17 provided with a set screw 18 for fixing the blade in position. The carrier 17 is of angular form in cross section and adapted to slide in a bearing sleeve 19 on the upper bracket 3, the sleeves 5 and 19 being similar in construction whereby provision is made to permit vertical adjustment of the table and vertical reciprocatory motion of the carrier 17 without permitting said parts to have any rotary or turning motion, so that at all times the cutters may be maintained in working alinement with each other. In practice, each sleeve 5 and 19 may be formed with a cap piece or removable section 20 secured in position by screws 21 whereby provision is made for the ready application and removal of the table and reciprocating carrier, as will be readily understood. The depending post 8 of the carrier yoke 9 terminates in a threaded stem 22 which extends into the slot or opening 4 and receives the threaded hub of an adjusting wheel 23, whereby the table may be raised and lowered to relatively adjust the cutters 12 and 13 as may be required to dispose the point of the movable cutter so that it will always lap the fixed cutter the very smallest degree that is practical to insure short cuts while avoiding danger of having the cutters strike end on. A locking wedge 24 is provided for securing the hand wheel 23 in fixed position after adjustment.

Figure 4:
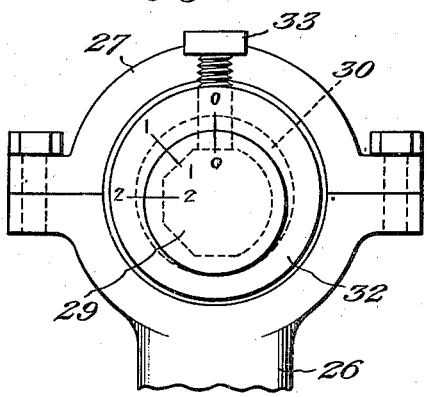
Fig. 4 is an end elevation of the same.

The movable blade carrier 17 is pivotally connected at its upper end, as shown at 25, to the lower end of a pitman rod 26 having at its upper end an eye 27 in the form of a strap which embraces an eccentric collar 28 upon the reduced and cranked end 29 of a cutter operating shaft 30, which is journaled horizontally in bearings 31 at the top of the bracket 3, said strap being operated through the medium of the eccentric collar to reciprocate the pitman 26 for a rapid, cutting motion of the movable cutter blade 13. The eccentric collar has an outwardly extending sleeve 32 which fits upon the reduced end 29 of the shaft 30 which is provided with a set screw 33 to engage an annular groove 34 and any one of a series of seats 35 in said groove whereby the eccentric collar may be axially adjusted on the shaft portion 29 to vary its eccentric action or degree of throw reciprocation of the pitman 26, and locked by the set screw in adjusted position against any possibility of casual displacement. On the exposed end of the shaft 29 and sleeve 32 are marked graduations, as seen in Fig. 4, with numerals opposite one or both sets, the marks being opposite the seats 35; and by inspecting these the operator may readily ascertain how the machine is set without separating any parts or looking elsewhere for the information. By means of such adjustments and variations of action of the eccentric, it will be evident that the movable cutter blade may be given different degrees of cutting motion, within a given range of a comparatively small maximum cutting motion, to vary the length of the cuts, so that by the rapid and continuous formation of large or small cuts within the maximum limits of cutting motion of the blades, the speed of cutting action depending upon the length of the cuts, it will be obvious that curves of different radius or other cuts along differently curved or regular lines may be rapidly and efficiently produced. By this means templets and similar objects, ordinarily stamped or cut by saws and the like out of sheet metal, may be much more easily, conveniently and quickly cut without the dangers, expense and loss of time incurred in using saws.

In practice, the cutting blades 12 and 13 are preferably made of peculiar construction, the lower or fixed blade 12 being provided with a cutting edge which is beveled at one side and slopes or inclines at an upward and rearward angle from its front edge, while the movable cutter blade 13 is provided with a cutting edge which is beveled also on one side and inclined downwardly and rearwardly at an angle from its front edge, the points or advanced portions of the cutting edges of the blades being opposite to each other, so that in operation the blades will act with a shear cut away from their tips or points, and with a degree and length of cut equal to the range of downward motion of the blade 13. An efficient cutting action is thus obtained, while by rapidly reciprocating the blade 13 through a very small working stroke or range, varying from, say, a thirty-second of an inch to, say, one-eighth of an inch, cuts of a length from one-sixteenth of an inch to one-fourth of an inch may be rapidly and conveniently made, and which will be suitable in a cutting action for producing long or short curves and irregular outlines of various kinds, thus enabling templets and other plates or articles having curved or irregularly shaped edges to be produced with great speed, convenience and economy. It is desirable to vary the speed of operation of the movable cutter according to the length of its stroke, a rapid operation being more efficient for a short stroke and a somewhat less rapidity for a long stroke, thus allowing even small curves to be produced along any given length of material with great rapidity. To this end the operating shaft 30 is provided with a series of stepped pulleys 36 arranged to be driven from a corresponding series of reversely arranged stepped pulleys 37 on a driving shaft 38 through the medium of a connecting belt or band 39, the stepped surfaces of the pulleys having such a coöperative or calibrated action with respect to the different adjustments of the eccentric collar as to give exactly the right amount of speed for any predetermined length of cutting stroke. On the operating shaft 30 may be employed a hand wheel 39′, which may be utilized as a fly wheel to secure evenness of motion and also as a starting wheel, to facilitate the starting of the machine, and as a brake wheel to enable the machine to be quickly checked down or stopped.

Attention is invited to the fact that the lower cutter 12 is held in the socket 14 by the screw 15, but is ordinarily not adjustable therein, the adjustment of the position of this cutter being effected by turning the wheel 23 so that the table 10 and all parts connected therewith are raised or lowered as desired. The construction makes an action possible which may be understood by those familiar with this art, but which I prefer to explain. Assuming that we wish to cut quite a large hole in the sheet of metal remote from its edge, and desire to preserve the metal around the hole. We cannot, in the circumstances, start to cut in from the edge of the sheet. We first make a mark on the hand wheel 23 opposite the wedge 24, turn the hand wheel so as to lower the lower cutter sufficiently to leave an opening between its cutting face of the upper cutter, then insert the sheet between the cutters and rotate the hand wheel reversely to cause the cutters to cut a small hole in the sheet. Now the machine is started, and the cutters begin with the small hole and may be caused to cut an opening of any size, according as the sheet is moved. It is quite obvious that this possibility would not be present in the machine if the original hole had to be cut by the movement of the upper tool as driven mechanically, and therefore the manual movement of the lower tool while the upper tool is not moving is useful for punching the initial hole, from which the larger opening can be cut.

It will be seen from the foregoing description that the invention provides a machine for cutting sheet metal which is of great value in enabling much more rapid work to be done than by the use of stamping machines or power or other shears or punching devices, and also in enabling work to be done which can not be accomplished by the use of these devices and which is customarily done by means of a fret saw, the objections to which are well known. It will also be seen that the invention is advantageous in enabling cuts to be made for curves of any radius, and in providing for variations of adjustment, stroke and speed of the cutters as occasion may require in producing different curves or irregular surfaces, which adjustments and variations of action may be quickly and conveniently effected. It will be further evidenced that the described construction of eccentric means for reciprocating the pitman rod is of great advantage over structures employing crank and slot connections, inasmuch as by my construction a much more rapid, smooth and even action may be obtained, and one in which the motion is secured without objectionable noises or strains. While the construction disclosed is preferred, it will, of course, be understood that changes within the scope of the appended claims may be made without departing from the spirit or sacrificing any of the advantages of the invention.

I claim:

1. In a machine of the class described, the combination with relatively fixed and movable cutters, carriers for them, means for adjusting the carrier of the fixed cutter, a guide for the carrier of the movable cutter, a driving shaft having a reduced and cranked end and an annular groove whose bottom is curved throughout one portion thereof and provided with seats throughout the remaining portion, an eccentric collar revolubly mounted on said crank and extending over its groove, means for adjusting the position of the collar on the crank, said means engaging the groove, and operable connections between the exterior of the collar and the carrier for the movable cutter.

2. In a machine of the class described, the combination with fixed and movable tools, a carrier for the movable tool, and a pitman connected with the carrier and having an eye at one end; of a power shaft having a crank provided with an annular groove, an eccentric collar surrounding the crank and journaled within the eye of said pitman, and a set screw passing radially inward through the collar into said groove, for the purpose set forth.

3. In a machine of the class described, the combination with fixed and movable tools, a carrier for the movable tool, and a pitman connected with the carrier; of a power shaft having a crank provided with an annular groove, an eccentric collar surrounding said crank and extended at one end to overlie said groove, an adjustable fastening device in the extended end of the collar projecting into the groove and contacting with the bottom thereof, and a strap inclosing the other end of the collar and connected with said pitman.

4. In a cutting machine, the combination with an upper movable cutter, means for reciprocating it vertically, and means for adjusting the throw of the reciprocations; of a lower cutter, a table having a hole surrounding this cutter, a yoke beneath the table and having a holder for this cutter, a post depending from the yoke and threaded at its lower end, an upright guide for the post, a nut on said threaded end below the guide and having a hand-wheel, and a wedge bearing against the hand wheel, for the purpose set forth.

5. In a machine for cutting sheet metal, the combination of a fixed cutter, a movable cutter mounted to reciprocate toward and from the fixed cutter, a driving shaft having an annular groove whose bottom is formed with a plurality of angular surfaces, an eccentric collar mounted for rotary adjustment on said shaft, a set screw carried by the collar for engagement with the groove and its tip with any of said angular surfaces whereby to vary the position and throw of the collar, a strap actuated by said collar, and a working connection between said strap and the movable cutter for reciprocating the latter.

6. In a machine for cutting sheet metal, the combination of a fixed cutter, a movable cutter mounted to reciprocate toward and from the fixed cutter, said cutters having cutting surfaces beveled on their relatively outer sides and inclined at an angle in reverse directions, a driving shaft having a plurality of angular surfaces, an eccentric mounted for rotary adjustment on said shaft, a set screw carried by the eccentric for engagement with any of said angular surfaces, whereby to vary the position and throw of the eccentric, a strap actuated by said eccentric, and a working connection between said strap and the movable cutter for reciprocating the latter.

7. In a machine of the class described, the combination with relatively fixed and movable cutters, and a driving shaft having near its end a plurality of angular surfaces; of an eccentric collar revolubly mounted on the shaft and inclosing said surfaces, adjusting means in the collar engaging said surfaces, and driving connections between the collar and the movable cutter, the exposed portions of the shaft and collar being marked with graduations, for the purpose set forth.

In testimony whereof I affix my signature.

JOHN L. L. KROOK.

In the presence of—
Geo. M. Somers,
E. P. Butler.